No. 729,206. PATENTED MAY 26, 1903.
M. MOSKOWITZ.
SELF REGULATING SYSTEM FOR ELECTRIC LIGHT AND POWER.
APPLICATION FILED MAR. 3, 1902.
NO MODEL.
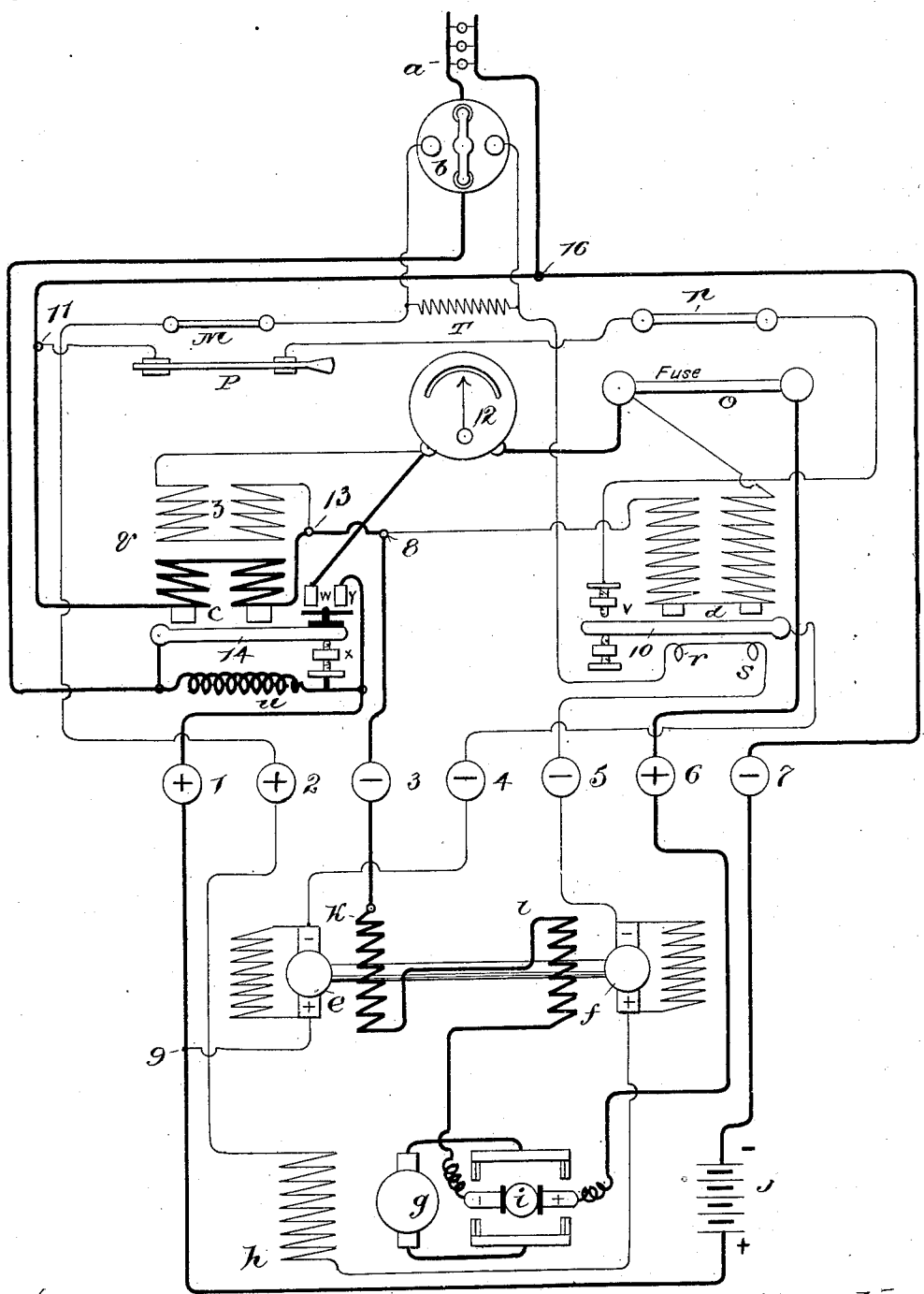

No. 729,206.

Patented May 26, 1903.

UNITED STATES PATENT OFFICE.

MORRIS MOSKOWITZ, OF BROOKLYN, NEW YORK, ASSIGNOR TO JAMES H. YOUNG, TRUSTEE, OF NEW YORK, N. Y.

SELF-REGULATING SYSTEM FOR ELECTRIC LIGHT AND POWER.

SPECIFICATION forming part of Letters Patent No. 729,206, dated May 26, 1903.

Application filed March 3, 1902. Serial No. 96,383. (No model.)

*To all whom it may concern:*

Be it known that I, MORRIS MOSKOWITZ, a resident of the borough of Brooklyn, in the city and State of New York, have invented certain new and useful Improvements in Self-Regulating Systems for Electric Light and Power, of which the following is a specification.

My invention relates particularly to electric light and power systems for railway-cars and other installations in which an electric generator is driven from a variable source of power—as, for example, the car-axle—and a storage battery is used to supply current when the generator is disconnected.

The object of my invention is primarily to secure more delicate and effectual regulation of the potential and current of the electric generator under varying speeds than heretofore, and a further object of my invention is to increase the efficiency of such light and power systems.

My invention consists in apparatus and circuits for carrying out the above objects and having the general mode of operation more fully described and illustrated in the accompanying specification and drawing.

The system may conveniently be illustrated by diagram of connections for the electric lighting of the car by means of a generator, the armature of which is connected to be driven by one of the car-axles.

Referring to the drawing, $g$ represents the armature of the main generator adapted to be driven from the car-axle, and $h$ represents the generator field-coil excited by a motor-generator $ef$, the motor $e$ deriving its energy from the storage battery $j$, and being connected by shaft $s'$ to the generator $f$, which supplies current to the field $h$. The work-circuit, shown as a lamp-circuit $a$, is supplied with current from either the generator $g$ or battery $j$, and the compensating resistance-coil $u$ is introduced into the lamp-circuit to compensate for the slight excess of voltage existing when the generator is also charging the battery. This compensating resistance $u$ is short-circuited when the battery is supplying the lamp-circuit in order that the full battery voltage may act directly on the lamps.

A suitable pole-changing switch $i$ is connected in the circuit of generator $g$, and the armature-circuit of said generator, as well as the circuit of battery $j$ and the lamp-circuit $a$, are all indicated in the diagram by heavy lines, while 1, 2, 3, 4, 5, 6, and 7 represent binding-posts, to which the various circuits leading to and from the apparatus are connected.

According to my invention auxiliary field-coils $k$ and $l$, included in the armature-circuit of the main generator $g$, are provided for the motor-generator $ef$, the field-coil $k$ in the motor being cumulative or wound to assist the field magnetism of the motor, while the coil $l$ in the generator $f$ is a differential winding opposing the field magnetism. Accordingly any increase of current and potential in the main generator due to an increase in speed will increase the current in the coils $k$ and $l$ of the motor-generator, thereby increasing the field magnetism of the motor $e$ and reducing its speed, which correspondingly reduces the speed of the generator $f$, causing it to supply less current to the field-winding $h$ of the main generator $g$, tending to maintain a constant difference of potential at the armature-brushes. The increase of current in the differential coil $l$ of generator $f$ also reduces the field magnetism of generator $f$ and aids in reducing the current in the field-winding $h$ of the main generator. It is obvious that the two coils $k$ and $l$ in the motor-generator controlling the motor $e$, on the one hand, and the generator $f$, on the other hand, will operate more effectually and produce more exact and efficient regulation of the main generator $g$ than would a single coil in either the motor or generator.

Suitable means, preferably automatic, controlling the starting of the motor-generator are provided, as an electromagnetic switch, having an electromagnet $d$ connected in this instance in shunt to the armature-circuit of the generator $g$ from a point adjacent the fuse $o$ to the point 8 on said armature-circuit. The armature-circuit of the motor $e$ is shown deriving its energy from the battery $j$ and is connected from a point 9 on the positive side of the battery-circuit, through the motor $e$ and binding-post 4 at the armature 10, controlled by electromagnet $d$, and from thence by contact $v$ when the armature 10 is attracted, closing said contact at fuse $n$ and through switch $p$ to the negative side of the battery-circuit to the point 11.

The circuit of the main generator $g$ and compensating resistance $u$ are controlled by suitable means, preferably automatic, shown in this instance as an electromagnetic switch $q$, provided with a shunt-winding $z$, connected to the main-generator circuit from a point adjacent the ammeter 12 in the generator-circuit at a point 13. The switch $q$ is also provided with a holding series coil $c$ in the main-generator circuit. The shunt-winding $z$ is so adjusted that it will not operate to attract the armature 14 and close a circuit between contacts $w$ and $y$ in the generator-circuit until the electromotive force of the main generator $g$ is increased sufficiently after starting to charge the battery $j$, when armature 14 is actuated to close the main-generator circuit between contacts $w$ and $y$, a short circuit formed by said armature around compensating resistance $u$ is opened, and the resistance is thrown into the lamp-circuit $a$.

The circuit of the generator $f$ includes, as stated, the field-coil $h$ and the main generator $g$ and also a resistance T or the switch $b$, controlling the lamp-circuit, according to the position of said switch. Electromagnets $r$ and $s$ are also included in the circuit of the generator $f$ and are arranged to control the armature 10 of magnet $d$ and attract said armature to open the circuit of motor $e$ when magnet $d$ becomes deënergized. When the car or the train comes to rest, current ceases to flow through magnet $d$; but since current still flows through magnets $r$ and $s$ they will operate, as stated, to break the circuit of the motor $e$ and stop said motor.

With the circuits and apparatus in the condition shown in the diagram and the generator $g$ cut out of circuit at contacts $w$ and $y$ of automatic switch $q$ the battery $j$ is connected to supply current to the lamp-circuit $a$ through a circuit leading from the positive pole of the battery to binding-post 1, from thence by means of back contact $x$ of armature 14 through said armature and by switch $b$ through the lamp-circuit $a$ and back to binding-post 7, and from thence to the negative pole of the battery. Assuming that switch $i$ on the main-generator circuit has been closed in one direction or the other, according to the direction of rotation of the generator-armature, and that the car is started, then the car having attained a comparatively slow speed—as, for instance, ten miles per hour—a small current is generated by the main generator $g$, due to residual magnetism, since there is no field excitation at this time. The small current generated is sufficient, however, to energize magnet $d$, connected in shunt to the generator-circuit, and cause it to attract its armature 10, thereby closing the circuit of the motor $e$ of the motor-generator $e\,f$, starting said motor, which comes up to full speed, since its armature and fields are supplied from the battery $j$, as hereinbefore described. The generator $f$ is then running at full speed also, since it is mechanically connected to the motor, and it supplies current to excite the field of the main generator $g$. When the train has attained a somewhat-higher speed—as, for instance, a speed of approximately fifteen miles per hour—the voltage across the brushes of the main generator will be somewhat higher than that of the battery $j$ and will be sufficient to charge the battery. The shunt-winding $z$ of switch $q$ then becomes energized, it being connected, as stated, to the main-generator circuit, and armature 14 is attracted, thereby closing the main-generator circuit between contacts $w$ and $y$ and throwing compensating resistance $u$ into the lamp-circuit. When this condition is reached, current will flow from the positive side of pole-changer $i$ to binding-post 6 through fuse $e$ and ammeter 12 to contact $w$, and from thence to contact $y$ and to the point 15 on the main-generator circuit. From this point the current branches, a portion passing through resistance $u$ and switch $b$ to and through the lamp-circuit $a$, and from thence through series coils $c$ on switch $q$ at binding-post 3 through auxiliary coils $k$ and $l$ in the motor-generator, and from thence back to the negative side of the pole-changer $i$. From the point 15 on the main-generator circuit adjacent contacts $w$ and $y$ another branch of the main-generator circuit passes to the binding-post 1, and from thence to and through battery $j$ at post 7 and then to the main circuit at the point 16, as above described, to the negative side of the pole-changer $i$, and it will be seen that current is supplied from the main generator $g$ through resistance $u$ to the lamp-circuit $a$, while at the same time the battery $j$ is being charged through a branch circuit. As the speed of the car now increases beyond fifteen miles an hour the voltage of the main generator $g$ tends to rise; but by means of the arrangement of the motor-generator $e\,f$ in the circuit the current supplied to the generator-field $h$ is regulated, as hereinbefore described, thereby maintaining a substantial constant-potential course brushes of the main generator $g$. It will thus be seen that according to my invention the field $h$ of the main generator $g$ is energized by means of an exciter embodied in the generator $f$, which exciter is actuated by a motor $e$, while means are provided for varying the speed of said motor and the field magnetism of said exciter inversely with variation in the armature-current of the generator.

Without limiting myself to the construction herein shown and described, I claim and desire to obtain by Letters Patent the following:

1. The combination of a generator, an exciter for the field-coils thereof, a motor for actuating said exciter, and means for varying the speed of said motor and the field magnetism of said exciter inversely with variations in the armature-current of the generator, substantially as described.

2. The combination of a generator, an exciter for the field-coils thereof, a motor for actuating said exciter, means for varying the field magnetism of the motor in correspondence with variations in the armature-current of the generator, and means for varying the field magnetism of the exciter inversely with variations in the armature-current of the generator, substantially as described.

3. The combination of a generator, an exciter for the field-coils thereof, a motor for actuating said exciter and means for reducing the speed of said motor and the field magnetism of said exciter as the armature-current of the generator increases, substantially as described.

4. The combination of a generator, an exciter for the field-coils thereof, a motor for actuating said exciter, and means for varying the field magnetism of both the motor and exciter in accordance with variations in the armature-current of the generator, substantially as described.

5. The combination of a generator, an exciter for the field-coils thereof, a motor for actuating said exciter, a work-circuit and a storage battery, means for connecting and disconnecting the generator with the battery and field-windings on the motor and exciter connected in series with the armature of the generator, substantially as described.

6. The combination of a generator, an exciter for the field-coils thereof, a motor for actuating said exciter and an electric magnetic switch controlling the circuit of the motor whereby the armature-circuit of the motor is automatically closed when the generator is started, substantially as described.

7. The combination of a main generator and motor-generator for energizing the field thereof, and means for automatically closing the armature-circuit of the motor-generator when the main generator is started, substantially as described.

8. The combination of a generator, an exciter for the field thereof, a motor for actuating said exciter, and means for varying the speed of the motor and the field magnetism of the exciter inversely with variations in the potential of the generator.

9. The combination of a generator, an exciter for the field thereof, a motor for actuating the said exciter, and means for varying the speed and field magnetism of the exciter in accordance with variations in the potential of the generator, substantially as described.

10. The combination of a generator, an exciter for the field thereof, a motor for actuating the said exciter, and a differential field-winding on the exciter in series with the armature of the generator, whereby the field magnetism of the exciter is varied inversely with variations in the armature-circuit of the generator, substantially as set forth.

11. The combination of a generator, an exciter for the field-coils thereof, a motor for actuating the said exciter, automatic means for closing the circuit of the motor when the generator is started, and means in the circuit of the exciter for opening the motor-circuit when the generator is stopped, substantially as set forth.

12. The combination of a generator, an exciter for the field-coils thereof, a motor for actuating the said exciter, an electromagnet connected in shunt to the generator-circuit for closing the circuit of the motor when the generator is started, and an electromagnet in series with the exciter for opening the circuit of the motor when the generator is stopped, said latter electromagnet being weaker in attractive force than the first electromagnet, substantially as described.

Signed this 28th day of February, 1902, at New York.

MORRIS MOSKOWITZ.

Witnesses:
HERBERT G. OGDEN, Jr.
E. VAN ZANDT.